(12) United States Patent
Hawks et al.

(10) Patent No.: X9604
(45) Date of Patent: Apr. 21, 1836

(54) SHINGLES, DRESSING

(76) Inventors: Nelson P. Hawks; Joseph Keyes

Nelson P. Hawks & Joseph Keys of Union. N. York.
Letters Patent

These schedule referred to in these Letters Patent, and making part of the same containing a description in the words of the said Nelson P. Hawks and Joseph Keys themselves, of their improvement in the machine for dressing shingles —

Be it known that we; Nelson P. Hawks, of Union, Broome County, State of New York, and Joseph Keyes, of Northfield, Washington County, State of Vermont, have made a new and useful improvement in the machine for dressing shingles, which is described as follows, reference being had to the annexed drawings of the same, making part of this specification. This machine consists of a convenient and suitable rectangular frame composed of sills, uprights, and cross pieces morticed and tenoned together in the usual manner and adapted in size and strength to receive & support the different parts of the machinery hereafter to be described. Upon the top of this frame resting & turning on gudgeons in cast iron standards are eight rollers, placed parallel to each other each pair turning together, the four lower ones having cog wheels on their gudgeons working into an intermediate cog wheel supported on an axle turning in boxes in the frame — Two of the upper rollers have grooved pulleys on their axles, around which passes a band that also passes around another grooved pully on the end of an axle at the end of the frame. The four upper rollers are made to press towards the lower rollers and upon the shingle passing between them by levers and weights acting on their gudgeons. The connection of the levers and weights is as follows — Across the frame at each end is a vibrating bar from which projects a lever and to which is appended a weight. From this vibrating bar projects four short levers, parallel with those before described — —
From the ends of said short levers rise vertically four connecting rods attached to bearers pressing upon the gudgeons of the upper rollers. This part of the machinery allows the rollers to accommodate themselves to the triangular shape of the shingle in passing between them — across the frame between the two sets of rollers before described, is a horizontal axle turning on journals on the frame upon which are three cylindrical heads supporting several knives placed spirally around them for dressing the shingle. On the end of this axle is a small pulley, around which passes a band from the driving power. Nearly on a line with the upper edge of the knives are two rests to support the shingle and which give it a proper direction in being cut. above the rest before described is a bearer for pressing the shingle down upon the rests and against the knives. This bearer consists of a small frame fastened to the standards. The bearer rises and falls in grooves in the sides of the small frame which is pressed down upon the shingle by levers fastened to a vibrating bar of iron. Two of which levers being borne down upon the bearer by a spring which presses upwards the end of the third lever. The gearing consists of a horizontal shaft lying across the frame on which is a small pulley; around said pulley passes a strap leading to a driving pulley. On one end of the horizontal shaft is a large pulley around which a strap passes to the small pulley on the axle of the cutting cylinder. On the other end of said horizontal shaft is a pinion working into two large cog wheels, which give motion to pulleys on their axles, and which also give motion by means of straps passing around them and around pulleys on the axles of the intermediate cog wheels on the lower rollers before mentioned and which give motion to them. On the axle of one of the intermediate cog wheels is a small pulley having a band leading from it to a pulley on the end of the axle at the side of the frame which carries the grooved pulley before mentioned. Motion is given to the upper rollers by a band passing around this grooved pulley & around the grooved pulleys on the axles of two of the upper rollers.

At the front of the frame is a roller or rest by which the shingle is introduced to the rollers. A fan is placed at the end of the frame driven by band & pulley for blowing away the chips from the cutters. A represents the frame. B four upper rollers. C four lower rollers. D cog wheels in do: E intermediate cog wheels. F grooved pulleys. G band of do. H another grooved pulley. I vibrating bar. K lever projecting from do. L weight suspended to do. M short levers on said bar. N connecting rods to short levers. O beams connected to said rods. P horizontal axle. Q spirally placed knives on do. R small pulley on said axle. S band of do. T rests over cutters. U bearer above the rests. V levers and spring of said bearer. W horizontal shaft. X small pulley on do. Y large pulley on do: Z pinion on do. a large cog wheel. b pulleys on cog wheel axles. c straps of do. d pulleys on axles of intermediate cog wheels. e a small pulley. f band of do. H.g. grooved pulley. h axle of do. i, introduction roller or rest. k the fan. The machine being put in motion by animal or other power the shingle to be dressed is introduced over the rest in front be-tween the rollers with its thin edge foremost and passes on to the cutters when it is dressed on one side to the shape required: and it then passes on to the af-ter part of the machine where it is delivered. –

The shingle is then turned and introduced and dressed on the other side in the same manner. The invention here claimed and desired to be secured by Letters Patent consists in the combination and arrangement of the several parts of the before described machine for dressing shingles: particularly in the mode of dressing a triangular piece of timber on both sides as herein set forth –. We however do not mean to confine ourselves to the precise proportions, kind of materials, or number of rollers, as before mentioned, intended to vary these in any manner considered best, so that the principle of the machine be preserved.

Witnesses
Mason Whiting
Geo. Park

Nelson P. Hawks
Joseph Keyes